United States Patent [19]

Ohta et al.

[11] Patent Number: 5,157,085
[45] Date of Patent: Oct. 20, 1992

[54] POLYIMIDE RESIN COMPOSITION

[75] Inventors: Masahiro Ohta, Yokohama; Saburo Kawashima, Yokosuka; Katsuaki Iiyama, Odawara; Shoji Tamai, Yokohama; Hideaki Oikawa, Yokohama; Akihiro Yamaguchi, Kamakura, all of Japan

[73] Assignee: Mitsui Toatsu Chemicals, Incorporated, Tokyo, Japan

[21] Appl. No.: 321,107

[22] Filed: Mar. 9, 1989

[30] Foreign Application Priority Data

| Mar. 18, 1988 | [JP] | Japan | 63-063517 |
| Mar. 25, 1988 | [JP] | Japan | 63-069665 |
| May 6, 1988 | [JP] | Japan | 63-109081 |
| May 6, 1988 | [JP] | Japan | 63-109083 |
| May 9, 1988 | [JP] | Japan | 63-110404 |
| May 9, 1988 | [JP] | Japan | 63-110405 |

[51] Int. Cl.$^5$ ............ C08L 79/08; C08L 81/06; C08G 69/48
[52] U.S. Cl. ............ 525/432; 525/420; 525/436; 525/537; 525/906; 525/928
[58] Field of Search ............ 525/537, 436, 420, 432, 525/906, 928

[56] References Cited

U.S. PATENT DOCUMENTS

| 4,017,555 | 4/1977 | Alvarez | 525/537 |
| 4,455,410 | 6/1984 | Giles, Jr. | 525/436 |
| 4,808,473 | 2/1989 | Brooks | 428/336 |
| 5,086,125 | 2/1992 | Ohta et al. | 525/432 |

FOREIGN PATENT DOCUMENTS

| 3312353 | 12/1988 | Japan | 525/436 |
| 3312354 | 12/1988 | Japan | 525/436 |
| 3312355 | 12/1988 | Japan | 525/436 |

*Primary Examiner*—Ana L. Carrillo
*Attorney, Agent, or Firm*—Burns, Doane, Swecker & Mathis

[57] ABSTRACT

This invention relates to molding resin compositions, and more particularly relates to polyimide resin compositions having markedly improved molding ability in addition to excellent high temperature stability, chemical resistance and mechanical strength.

The polyimide resin compositions of this invention comprises 99.9 to 50.0% by weight of the polyimide and 0.1 to 50.0% by weight of polyphenylene sulfide and/or aromatic polysulfone and/or aromatic polyetherimide high-temperature engineering polymer. The polyimide consists essentially of recurring units of the following formula:

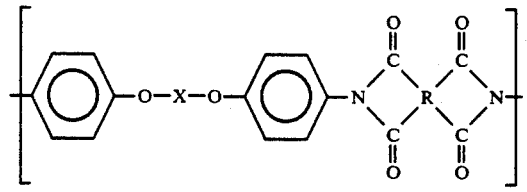

wherein X is

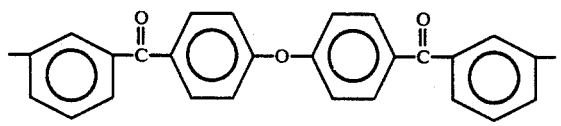

or

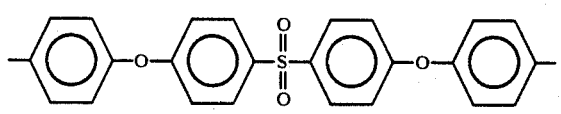

and R is, for example,

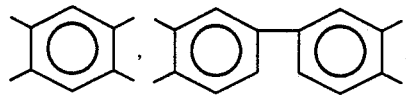

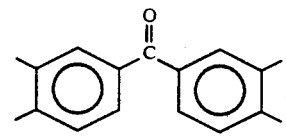

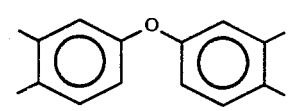

or

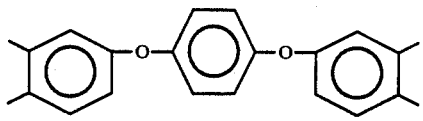

24 Claims, No Drawings

POLYIMIDE RESIN COMPOSITION

BACKGROUND OF THE INVENTION

The present invention relates to a molding resin composition, and more particularly relates to a molding resin composition of polyimide which is excellent in high-temperature stability, chemical resistance and mechanical strength as well as processing ability in molding.

Polyimide has so far been excellent in mechanical strength, dimensional stability, high-temperature stability, flame retardance and electrical insulative properties. Therefore polyimide has been used in the field of electric and electronic parts, aeronautics and space instruments and transport machinery. It is also expected for a wide use in the future in the field where high-temperature resistance is required.

A variety of polyimides which exhibit outstanding properties have been developed. Some polyimides, however, have no distinct glass transition temperature, although they are excellent in high-temperature stability. As a result, when employed as molding materials, specific methods such as sinter molding must be used for processing. Other polyimides which are excellent in processability have low glass transition temperatures and are soluble in halogenated hydrocarbons, which renders these polyimides unsatisfactory for use in applications which require high-temperature stability and solvent resistance. Thus, these polyimides have numerous advantages and disadvantages.

Accordingly a polyimide has been desired which is excellent in high-temperature stability and solvent resistance and also has an outstanding processing ability as a molding material.

The present inventors have found a polyimide which satisfies the aforementioned proparties. The polyimide has recurring units of the formula:

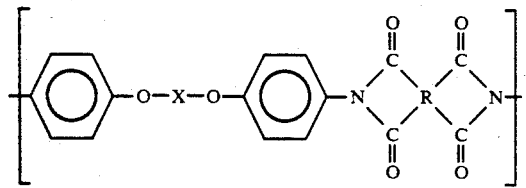

wherein X is a divalent radical selected from the group consisting of a radical having the formula:

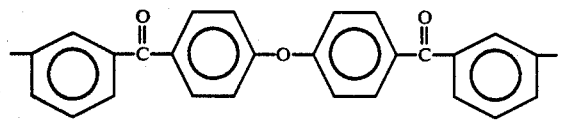

and

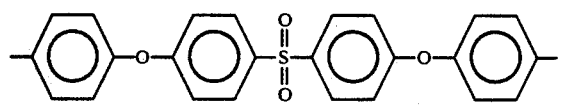

and R is a tetravalent radical selected from the group consisting of an aliphatic radical having 2 or more carbon atoms, alicyclic radical, monoaromatic radical, fused polyaromatic radical, and polyaromatic radical where aromatic radicals are linked to one another directly or via a bridge member.

This polyimide is disclosed by Mitsui Toatsu Chemicals, Inc. in Japanese Laid-Open Patent Nos. TOKKAI-SHO 63-243132 (1988), 64-9226 (1989) and 64-9227 (1989).

The above polyimide is a thermoplastic polyimide having fluidity at high temperatures in addition to excellent mechanical, thermal and electrical properties.

Compared to ordinary engineering polymers represented by polyethylene terephthalate, polybutylene terephthalate, polysulfone and polyphenylene sulfide, polyimide is superior in high-temperature resistance and other properties. On the other hand, the processing ability of the polyimide is still inferior to these polymers.

Generally, in injection molding or extrusion molding, a lower melt viscosity leads to better processing ability. For example, a higher melt viscosity requires a higher injection pressure in the molding stage and the molded products are subject to excessive stress, thereby lowering operation efficiency and causing adverse effects on the properties of the molded products. The above stated polyimide can be injection molded because it has an excellent fluidity at high temperatures. Nevertheless it is desirable to enhance the workability of the polyimide.

SUMMARY OF THE INVENTION

The object of this invention is to provide a molding resin composition of polyimide which has a very excellent melt flowability without adverse affects on the essential properties of polyimide.

DETAILED DESCRIPTION OF THE INVENTION

The present invention relates to a polyimide resin composition comprised of 99.9 to 50.0% by weight of polyimide which consists essentially of recurring units of the formula:

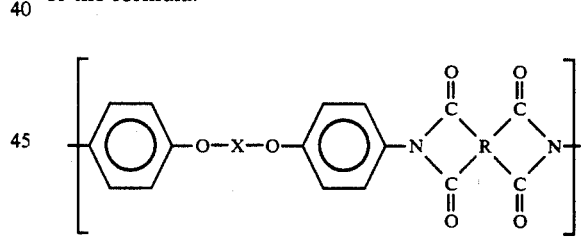

wherein X is a divalent radical selected from the group consisting of a radical having the formula:

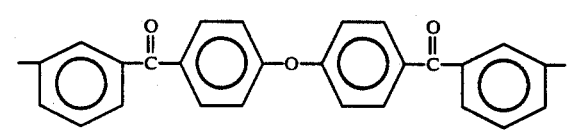

and

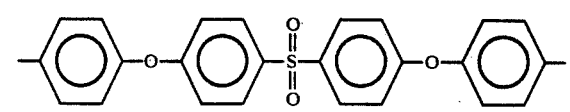

and R is a tetravalent radical selected from the group consisting of an aliphatic radical having 2 or more carbon atoms, alicyclic radical, monoaromatic radical, fused polyaromatic radical, and polyaromatic radical where aromatic radicals are linked to one another directly or via a bridge member, and 0.1 to 50.0% by weight of high-temperature engineering polymer selected from the group consisting of polyphenylene sulfide, aromatic polysulfone and aromatic polyetherimide.

Polyimide used in the method of this invention is derived from diamine of the following formula:

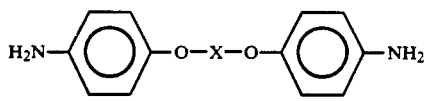

where X is the same as above.

The diamine is bis[4-(3-(4-aminophenoxy)benzoyl)phenyl]ether or bis[4-(4-(4-aminophenoxy)phenoxy)phenyl]sulfone.

These diamines have the following formulae respectively:

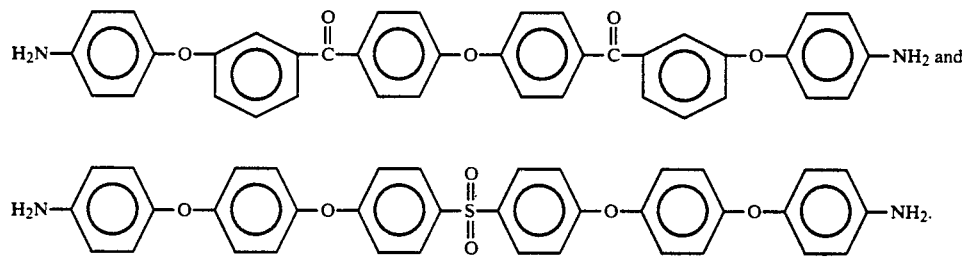

The diamine is reacted with at least one of tetracarboxylic dianhydride in an organic solvent to yield polyamic acid. The polyamic acid is imidized to obtain polyimide.

The tetracarboxylic dianhydride used in the above reaction is an anhydride of the formula:

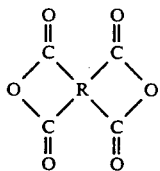

where R is the same as above.

The tetracarboxylic dianhydride used in the method includes, for example, ethylenetetracarboxylic dianhydride, butanetetracarboxylic dianhydride, cyclopentanetetracarboxylic dianhydride, pyromellitic dianhydride,
3,3',4,4'-benzophenonetetracarboxylic dianhydride,
2,2',3,3'-benzophenonetetracarboxylic dianhydride,
3,3',4,4'-biphenyltetracarboxylic dianhydride,
2,2'3,3'-biphenyltetracarboxylic dianhydride,
2,2-bis(3,4-dicarboxyphenyl)propane dianhydride,
2,2-bis(2,3-dicarboxyphenyl)propane dianhydride,
bis(3,4-dicarboxyphenyl) ether dianhydride, bis(2,3-dicarboxyphenyl) ether dianhydride, bis(3,4-dicarboxyphenyl) sulfone dianhydride,
1,1-bis-(2,3-dicarboxyphenyl)ethane dianhydride,
bis(2,3-dicarboxyphenyl)methane dianhydride,
bis(3,4-dicarboxyphenyl)methane dianhydride,
4,4'-(p-phenylenedioxy)diphthalic dianhydride,
4,4'-(m-phenylenedioxy)diphthalic dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride and
1,2,7,8-phenanthrenetetracarboxylic dianhydride.

Particularly preferred tetracarboxylic dianhydrides are pyromellitic dianhydride, 3,3',4,4'-biphenyltetracarboxylic dianhydride, 3,3',4,4'-benzophenonetetracarboxylic dianhydride, bis(3,4-dicarboxyphenyl) ether dianhydride and 4,4'-(p-phenylenedioxy)diphthalic dianhydride.

The tetracarboxylic dianhydride can be used singly or in mixtures of two or more.

The polyimide which is used in the composition of this invention is prepared by using the above stated diamine as a raw material. In order to obtain the composition of this invention, other diamines can also be used in combination with the diamine within the range which has no adverse effect on the advantageous properties of the polyimide.

Examples of diamines which may be used in admixture with the diamine include, m-phenylenediamine, o-phenylenediamine, p-phenylenediamine, m-aminobenzylamine, p-aminobenzylamine, bis(3-aminophenyl) ether, (3-aminophenyl) (4-aminophenyl) ether, bis(4-aminophenyl) ether, bis(3-aminophenyl) sulfide, (3-aminophenyl) (4-aminophenyl) sulfide, bis(4-aminophenyl) sulfide, bis(3-aminophenyl) sulfoxide, (3-aminophenyl) (4-aminophenyl) sulfoxide, bis(4-aminophenyl) sulfoxide, bis(3-aminophenyl) sulfone, (3-aminophenyl) (4-aminophenyl) sulfone, bis(4-aminophenyl) sulfone, 3,3'-diaminobenzophenone, 3,4'-diaminobenzophenone, 4,4'-diaminobenzophenone,
bis[4-(3-aminophenoxy)phenyl]methane,
bis[4-(4-aminophenoxy)phenyl]methane,
1,1-bis[4-(3-aminophenoxy)phenyl]ethane,
1,1-bis[4-(4-aminophenoxy)phenyl]ethane,
1,2-bis[4-(3-aminophenoxy)phenyl]ethane,
1,2-bis[4-(4-aminophenoxy)phenyl]ethane,
2,2-bis[4-(3-aminophenoxy)phenyl]propane,
2,2-bis[4-(4-aminophenoxy)phenyl]propane,
2,2-bis[4-(3-aminophenoxy)phenyl]butane,
2,2-bis[4-(4-aminophenoxy)phenyl]butane,
2,2-bis[4-(3-aminophenoxy)phenyl-1,1,1,3,3,3-hexafluoropropane,
2,2-bis[4-(4-aminophenoxy)phenyl-1,1,1,3,3,3-hexafluoropropane,
1,3-bis(3-aminophenoxy)benzene, 1,3-bis(4-aminophenoxy)benzene,
1,4-bis(3-aminophenoxy)benzene, 1,4-bis(4-aminophenoxy)benzene, 4,4'-bis(3-aminophenoxy)biphenyl, 4,4'-bis(4-aminophenoxy)biphenyl,
bis[4-(3-aminophenoxy)phenyl] ketone,
bis[4-(4-aminophenoxy)phenyl] ketone,
bis[4-(3-aminophenoxy)phenyl] sulfide,
bis[4-(4-aminophenoxy)phenyl] sulfide,
bis[4-(3-aminophenoxy)phenyl] sulfoxide,
bis[4-(4-aminophenoxy)phenyl] sulfoxide,
bis[4-(3-aminophenoxy)phenyl] sulfone,
bis[4-(4-aminophenoxy)phenyl] sulfone,
bis[4-(3-aminophenoxy)phenyl] ether and
bis[4-(4-aminophenoxy)phenyl] ether.

The high temperature engineering polymer which is used in the present invention includes, for example, polyphenylene sulfide, aromatic polysulfone and aromatic polyetherimide.

Polyphenylene sulfide is a resin having recurring units of the formula:

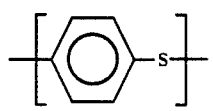

The preparation process of the resin is disclosed, for example, by Phillips Petroleum Co. in U.S. Pat. No. 3,354,129 and Japanese Patent Publication TOKKO-SHO 45-3368 (1970). The resin can be commercially available, for example, as RYTON (Trade Mark of Phillips Petroleum Co. in U.S.A.). According to the patent disclosure, polyphenylene sulfide is produced by reacting p-chlorobenzene with sodium sulfide monohydrate at 160-250° C. under pressure in N-methylpyrrolidone solvent. Polyphenylene sulfide includes various grades such as non-crosslinked or partially crosslinked polymers and polymers having different polymerization degrees. These grades can be easily produced by conducting a post-treatment process and are also available in the market. Therefore grades having suitable melt viscosity for the desired polymer blend can be optionally prepared or purchased in the market.

Aromatic polysulfone is a well known high temperature engineering polymer having a polymer chain represented by the formula:

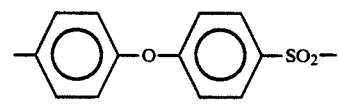

and described, for example, by V. J. Leslie et al, in CHEMITECH, July 1975, 426–432.

Representative examples of recurring units constituting aromatic polysulfone of this invention include:

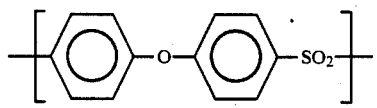

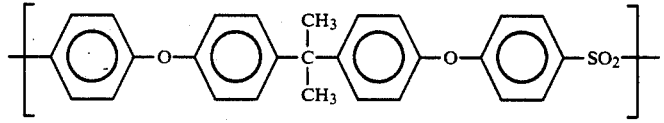

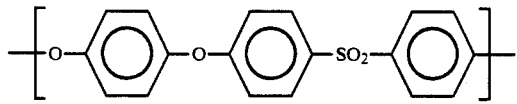

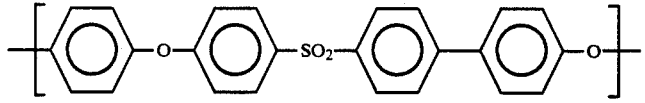

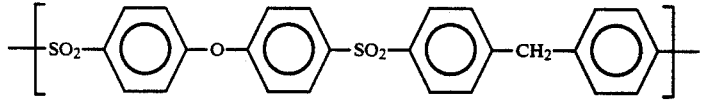

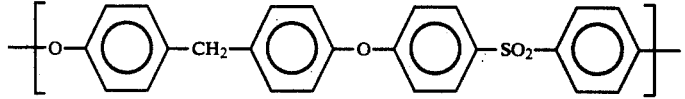

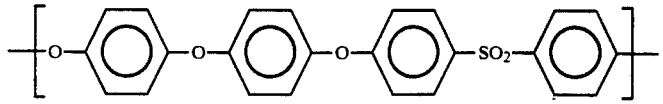

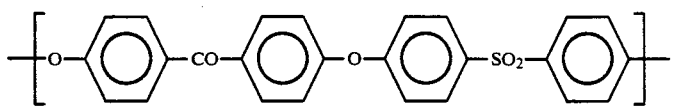

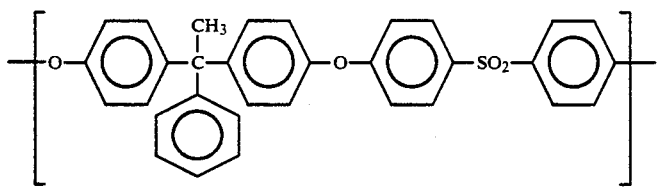

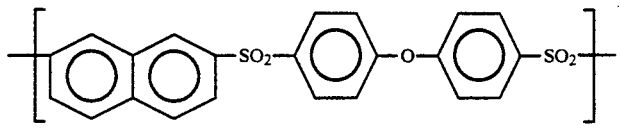

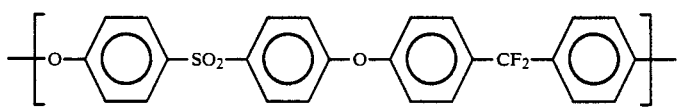

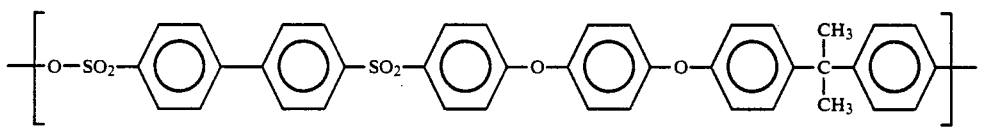

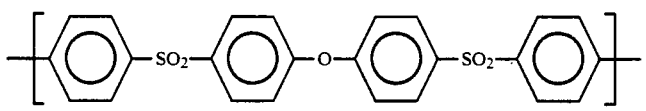

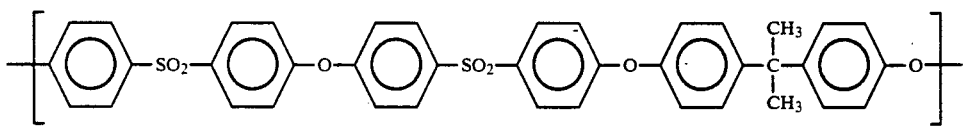

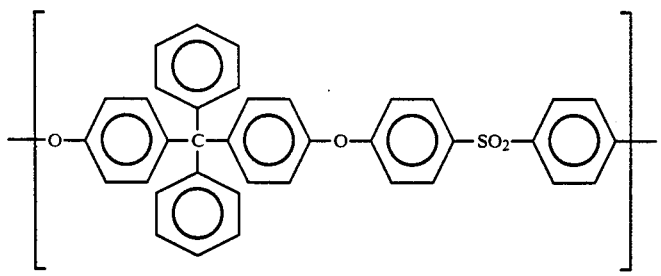

Typical aromatic polysulfones include, for example, polysulfone consisting of recurring units represented by the formula:

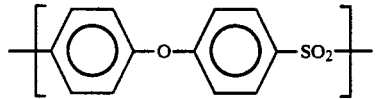

(Commercially available from Imperial Chemical Industries in Britain under the trademark VICTREX PES) and polysulfone consisting of recurring units represented by the formula:

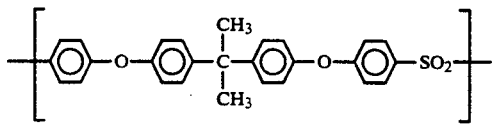

(Commercially available from Union Carbide Corp. in U.S.A. under the trademark UDEL POLYSULFONE).

Different grades of aromatic polysulfone having various polymerization degrees can be easily produced.

Therefore grades having a suitable melt viscosity for the desired polymer blend can be optionally selected.

Aromatic polyetherimide is a polymer having both ether and imide linkages as a required bonding unit and is substantially composed of recurring units of the following formula:

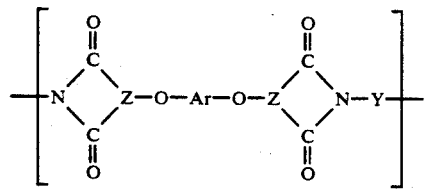

wherein Z is a trivalent aromatic radical where two valences out of three are connected with two adjacent carbon atoms, and Ar and Y are respectively a divalent monoaromatic radical and a divalent polyaromatic radical connected with a bridge member.

This polyetherimide is also a well known high temperature engineering polymer and is described, for example, by Takekoshi et al. in Polymer Preprint 24,(2),312–313 (1983).

Suitable examples of recurring units constituting aromatic polyetherimide of this invention include:

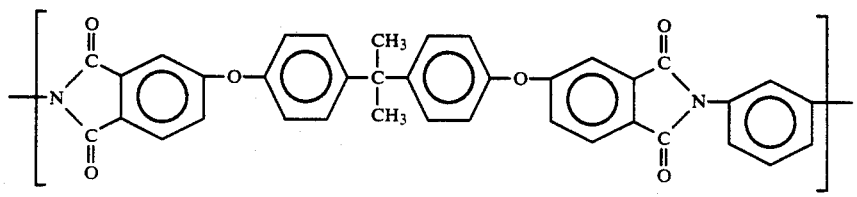

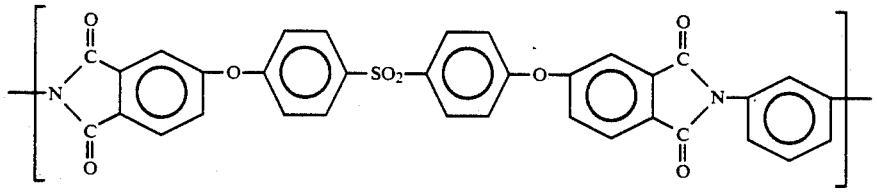

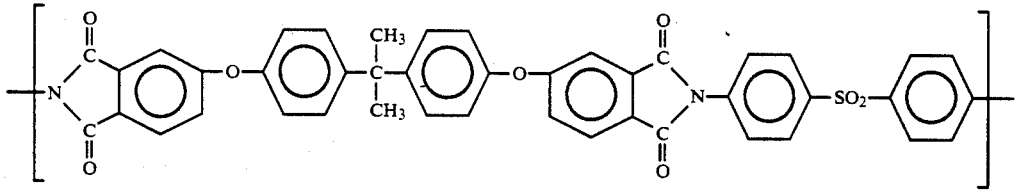

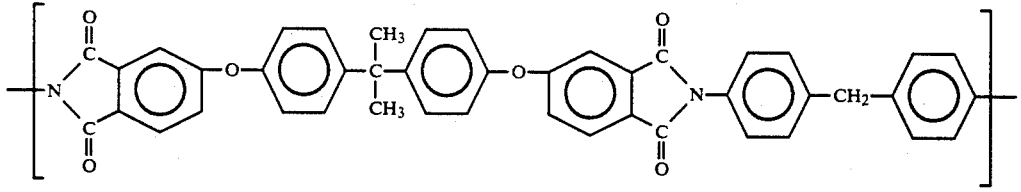

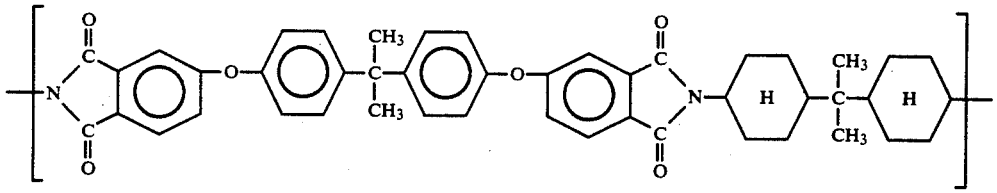

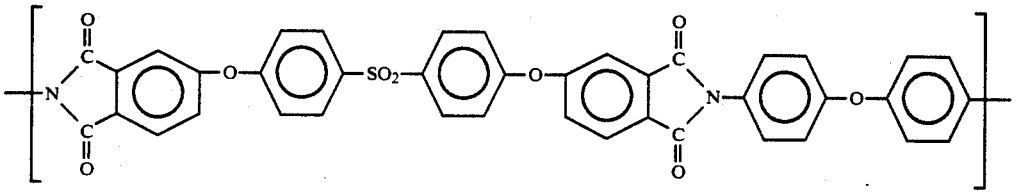

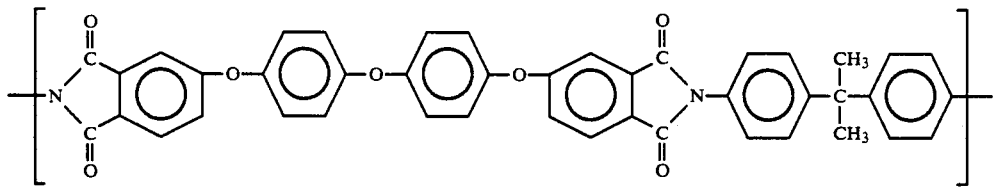

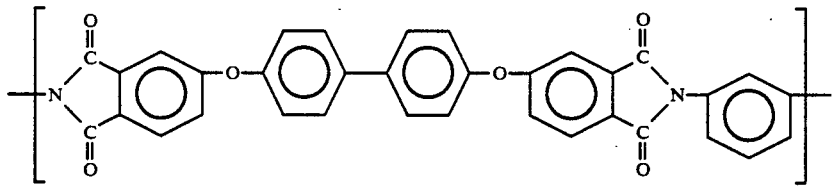

Aromatic polyetherimide is commercially available from General Electric Co. in U.S.A. under the trademarks ULTEM-1000, ULTEM-4000 and ULTEM-6000 etc.

Aromatic polyetherimide particularly consisting of recurring units of the formula:

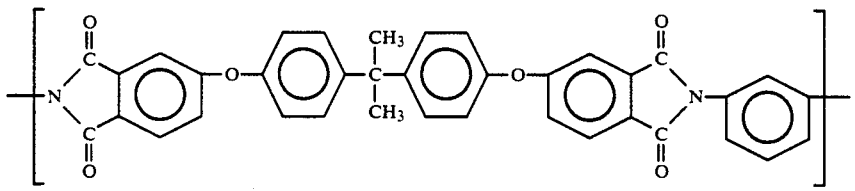

is commercially available from General Electric Co. under the trademark ULTEM-1000.

Several grades of aromatic polyetherimide having various polymerization degrees can be easily produced. Therefore grades having suitable melt viscosity for the desired polymer blend can be optionally selected.

The molding composition of resin in this invention is prepared so as to comprise to above mentioned polyimide in the range of 99.9 to 50.0% by weight and the high-temperature engineering polymer in the range of 0.1 to 50.0% by weight and total sum of 100% by weight.

The resin of this invention based on polyimide/polyphenylene sulfide exhibits remarkably low melt viscosity in a high temperature region above 350° C. The advantageous effect on melt viscosity obtained by the polyphenylene sulfide can be found even in small amounts. The lower limit of the amount in the composition is 0.1% by weight. The preferred amount is not less than 0.5% by weight.

Polyphenylene sulfide is excellent in chemical resistance, water absorption and flame retardance among the high-temperature stable resins. It, however, is inferior particularly in elongation at break and impact resistance. Therefore, too much polyphenylene sulfide in the above composition is unfavorable because the essential mechanical strength of polyimide can not be maintained. The amount of polyphenylene sulfide in the composition has an upper limit and is preferably 50.0% by weight or less.

The resin of this invention based on polyimide/aromatic polysulfone exhibits remarkably low melt viscosity in a high temperature region such as above 380° C. The advantageous effect on melt viscosity obtained by the aromatic polysulfone can be found even in a small amount. The lower limit of amount in the composition is 0.1% by weight. The preferred amount is not less than 0.5% by weight.

Aromatic polysulfone is excellent in mechanical strength at high temperatures among the high-temperature stable resins. It, however, is inferior to polyimide in mechanical strength, izod impact strength in particular. Therefore, too much aromatic polysulfone in the above composition is unfavorable because the essential mechanical strength of polyimide cannot be maintained. The amount of aromatic polysulfone in the composition has an upper limit and is preferably 50.0% by weight or less.

The resin of this invention based on polyimide/aromatic polyetherimide exhibits remarkably low melt viscosity as compared with polyimide alone in a high temperature region, above 350° C. in particular. The effect can be found even in a small amount of aromatic polyetherimide. The lower limit in the composition is 0.1% by weight. The preferred amount is not less than 0.5% by weight.

Aromatic polyetherimide is excellent in mechanical strength at high temperatures among the high-temperature stable resins. It, however, is inferior to polyimide in mechanical strength, izod impact strength in particular. Therefore, too much aromatic polyetherimide is unfavorable because the essential mechanical strength of polyimide cannot be maintained.

Aromatic polyetherimide is easily soluble in halogenated hydrocarbons such as methylene chloride and chloroform as well as amide type solvents such as dimethyl acetamide and N-methyl-pyrrolidone. Therefore, too much aromatic polyetherimide in the composition is unfavorable because the essential solvent resistance of polyimide cannot be maintained.

For these reasons, the amount of aromatic polyetherimide has an upper limit in the composition and is preferably 50.0% by weight or less.

In the preparation of the composition in this invention, known methods can be employed and, for example, the below described methods are preferred.

(1) Polyimide powder and high-temperature engineering polymer powder are pre-mixed to prepare a uniform mixture of powder by using a blender such as a mortar, Henschel mixer, drum blender, tumbler blender, ball mill or ribbon blender.

(2) Polyimide powder is previously dissolved or suspended in an organic solvent. High-temperature engineering polymer is added to the resulting solution or suspension and dispersed or dissolved uniformly, followed by removing the solvent to give a powdered mixture.

(3) High-temperature engineering polymer is suspended in an organic solvent solution of polyamic acid which is the precursor of polyimide in this invention. The resultant suspension is imidized by heat treatment at 100–400° C. or by chemical imidization with a usual imidizing agent, followed by removing the solvent to give a powdered mixture.

The powdered resin composition of polyimide thus obtained can be used as is for various molding applications such as injection molding, compression molding, transfer molding and extrusion molding. A more preferred method is fusion blending of the resins prior to molding.

Fusion blending of polyimide and high-temperature engineering polymer in the forms of, respectively, powder and powder, pellet and pellet, or powder and pellet is a simple and effective method.

Fusion blending can be carried out by using fusion blending equipment for known rubbers and plastics, for example, hot rolls, Banbury mixer, Brabender and extruder. The fusion temperature is set above the fusion temperature of the formulated system and below the initiation temperature of its decomposition. The temperature for blending polyimide with polyphenylene sulfide is normally in the range of 300–420° C. and preferably in the range of 320–400° C. The blending of polyimide with aromatic polysulfone or aromatic polyetherimide is carried out normally in the range of 280–420° C. and preferably in the range of 300–400° C.

As to the method of molding the resin composition in this invention, injection and extrusion molding are suitable because these methods form an uniform blend of fused polymers and have a high productivity. Other processing methods such as transfer molding, compression molding and sinter molding may also be applied.

In addition, the resin composition of this invention may contain at least one solid lubricant such as molybdenum disulfide, graphite, boron nitride, lead monoxide and lead powder. The composition may also contain at least one reinforcing material such as glass fibers, carbon fibers, aromatic polyamide fibers, potassium titanate fibers and glass beads.

The resin composition of this invention may contain at least one commonly used additive within the range which has no adverse effect on the object of this invention. Such additives include, for example, antioxidants, heat stabilizers, ultraviolet absorbers, flame retardants, auxiliary flame retardants, antistatic agents, lubricants and coloring agents.

EXAMPLES

The present invention will hereinafter be illustrated further in detail by way of synthesis examples, examples and comparative examples.

SYNTHESIS EXAMPLE 1

A reaction vessel equipped with a stirrer, reflux condenser and nitrogen inlet tube was charged with 5.92 kg (10 moles) of bis[4-(3-(4-aminophenoxy)benzoyl)phenyl] ether and 18.8 kg of N,N-dimethylacetamide. To the mixture was added 2.14 kg (9.8 moles) of pyromellitic dianhydride by portions in a nitrogen atmosphere at room temperature and at a rate to avoid a large temperature rise of the solution and stirred for 24 hours at room temperature.

To the resultant polyamic acid solution, 5.37 kg of N,N-dimethylacetamide was added, and then 4.08 kg (40 moles) of triethylamic and 6.03 kg (60 moles) of acetic anhydride were added dropwise in a nitrogen atmosphere at room temperature and further stirred for 24 hours at room temperature. The reaction mixture was poured into 250 l of water well stirred. The separated product was filtered, washed with methanol and dried at 150° C. for 24 hours under reduced pressure to obtain 7.47 kg of pale yellow polyimide powder (about 98% yield). The inherent viscosity of polyimide powder was 0.86 dl/g. The inherent viscosity was measured at 35° C. after dissolving 0.5 g of the polyimide powder in 100 ml of a solvent (a mixture of p-chlorophenol and phenol in a ratio of 90:10 by weight) at elevated temperatures and cooling the resulting solution.

The polyimide powder has a glass transition temperature of 235° C. in accordance with the DSC method.

|  | Elemental analysis | | |
| --- | --- | --- | --- |
|  | C | H | N |
| Calculated (%) | 74.42 | 3.38 | 3.62 |
| Found (%) | 74.35 | 3.30 | 3.58 |

SYNTHESIS EXAMPLES 2–5

The same procedures as Synthesis example 1 were carried out. However, raw materials were changed. The diamines and tetracarboxylic dianhydrides were varied to obtain various polyimide powders. Table 1 illustrates conditions for the synthesis of the polyimide resins, inherent viscosities and glass transition temperatures (Tg) thereof.

SYNTHESIS EXAMPLE 6

A reaction vessel equipped with a stirrer, reflux condenser and nitrogen inlet tube was charged with 61.67 kg (100 moles) of bis[4-4-(4-aminophenoxy)phenoxy)phenyl] sulfone and 473.0 kg of N,N-dimethylacetamide. To the mixture was added 20.7 kg (95 moles) of pyromellitic dianhydride by portions in a nitrogen atmosphere at room temperature and at a rate to avoid a large temperature rise of the solution and stirred for 20 hours at room temperature.

The inherent viscosity of the polyamic acid thus obtained was 0.56 dl/g. The inherent viscosity was measured at 35° C. after dissolving 0.5 g of the polyamic acid in 100 ml of N,N-dimethylacetamide.

To the resultant polyamic acid solution, 275 kg of N,N-dimethylacetamide was added, and then 40.4 kg (400 moles) of triethylamine and 61.2 kg (600 moles) of acetic anhydride were added dropwise in a nitrogen atmosphere at room temperature and stirred for 24 hours at room temperature. The reaction mixture was poured into 2,500 l of water well stirred. The separated product was filtered, washed with methanol and dried at 180° C. for 5 hours under reduced pressure to obtain 77.2 kg of polyimide powder (about 98% yield).

The polyimide powder had a glass transition temperature of 285° C. and melting point of 420° C. in accordance with the DSC method.

TABLE 1

| Synthesis example | Diamine | kg (mole) | Tetracarboxylic dianhydride | kg (mole) | Inherent Viscosity (dl/g) | Tg (°C.) |
|---|---|---|---|---|---|---|
| 2 | Bis[4-(3-(4-aminophenoxy)-benzoyl)phenyl] ether | 5.92 kg (10 moles) | 3,3',4,4'-Benzophenonetetra-carboxylic dianhydride | 3.16 kg (9.85 moles) | 0.67 | 198 |
| 3 | Bis[4-(3-(4-aminophenoxy)-benzoyl)phenyl] ether | 5.92 kg (10 moles) | 3,3',4,4'-Biphenyltetra-carboxylic dianhydride | 2.90 kg (9.85 moles) | 0.69 | 107 |
| 4 | Bis[4-(3-(4-aminophenoxy)-benzoyl)phenyl] ether Bis(4-aminophenyl) ether | 4.74 kg (8 moles) 0.40 kg (2 moles) | Pyromellitic dianhydride | 2.14 kg (9.8 moles) | 0.62 | 245 |
| 5 | Bis[4-(3-(4-aminophenoxy)-benzoyl)phenyl] ether 4,4'-Bis(3-aminophenoxy)-biphenyl | 2.96 kg (5 moles) 1.84 kg (5 moles) | Bis(3,4-dicarboxyphenyl) ether dianhydride | 3.038 kg (9.8 moles) | 0.61 | 225 | respectively measured in accordance with ASTM D-638, D-790, D-256 and D-648.

Besides Table 3 also illustrates minimum injection pressure which indicates melt flowability. Lower minimum injection pressure results from lower melt flowability.

TABLE 2

| Synthesis example | Diamine | kg (mole) | Tetracarboxylic dianhydride | kg (mole) | Inherent Viscosity (dl/g) | Tg (°C.) |
|---|---|---|---|---|---|---|
| 7 | Bis[4-(4-(4-aminophenoxy)-phenoxy)phenyl] sulfone | 61.67 kg (100 moles) | 3,3',4,4'-Benzophenonetetra-carboxylic dianhydride | 30.59 kg (95 moles) | 0.53 | 242 |
| 8 | Bis[4-(4-(4-aminophenoxy)-phenoxy)phenyl] sulfone | 61.67 kg (100 moles) | Bis(3,4-dicarboxyphenyl) ether dianhydride | 29.45 kg (95 moles) | 0.54 | 235 |
| 9 | Bis[4-(4-(4-aminophenoxy)-phenoxy)phenyl] sulfone | 61.67 kg (100 moles) | 3,3',4,4'-Biphenyltetra-carboxylic dianhydride | 27.93 kg (95 moles) | 0.51 | 261 |
| 10 | Bis[4-(4-(4-aminophenoxy)-phenoxy)phenyl] sulfone | 61.67 kg (100 moles) | 4,4'-(p-phenylenedioxy)-diphthalic dianhydride | 38.19 kg (95 moles) | 0.53 | 219 |

| | Elemental analysis | | | |
|---|---|---|---|---|
| | C | H | N | S |
| Calculated (%) | 69.17 | 3.26 | 3.51 | 4.01 |
| Found (%) | 69.12 | 3.24 | 3.50 | 3.98 |

SYNTHESIS EXAMPLES 7-10

The same procedures as Synthesis example 6 were carried out, except various tetracarboxylic dianhydrides were used in place of pyromellitic dianhydride. The amounts of diamine and tetracarboxylic dianhydrides were varied to obtain various polyimide powders. Table 2 illustrates conditions for the synthesis of the polyimide resins, inherent viscosities of the polyamic acids and glass transition temperatures (Tg) of the polyimides.

EXAMPLE 1-3

The polyimide powder obtained in Synthesis example 1 was dry blended with polyphenylene sulfide powder RYTON P-4 (a trademarked product of Phillips Petroleum Co.) in various compositions as illustrated in Table 3. The mixture was kneaded by fusing at 320-340° C. in a double screw extruder and extruded to obtain uniform pellets. The pellets thus obtained was injection molded with an Arburg injection molding machine (Type: Allround A-220 from Arburg Co.) at an injection temperature of 320-400° C. and a mold temperature of 150° C. The physical and thermal properties of the molded product were measured and the results are illustrated in Table 3. In Table 3, tensile strength and elongation at break, flexural strength and flexural modulus, izod impact strength, and heat distortion temperature were

COMPARATIVE EXAMPLE 1

The same procedures as Example 1-3 were carried out except that a composition outside the scope of this invention was used. The physical and thermal properties of molded specimens were measured and the results are illustrated in Table 3.

EXAMPLES 4-12 AND COMPARATIVE EXAMPLES 2-5

The procedures of Examples 1-3 were repeated by using the polyimide powder obtained in Synthesis examples 2-5 and polyphenylene sulfide powder RYTON-P-4 to give uniformly blended pellets. The pellets were injection molded. Physical and thermal properties were measured on the molded speciments. The results on both within and outside the scope of this invention are illustrated in Table 4 as Examples 4-12 and Comparative examples 2-5, respectively.

EXAMPLES 13-15

The polyimide powder obtained in Synthesis example 1 was dry blended with aromatic polysulfone powder UDEL POLYSULFONE P-1700 (a trademarked product of Union Carbide Corp.) in various compositions as illustrated in Table 5. The mixture was kneaded by fusing at 360-390° C. in a double screws extruder and extruded to obtain uniform pellets. The pellets thus obtained was injection molded at an injection temperature of 360-390° C. and a mold temperature of 170° C. The physical and thermal properties of the molded product were measured and the results are illustrated in Table 5.

The glass transition temperature was measured in accordance with the TMA penetration method.

molded specimens. The results on examples both within and outside the scope of this invention are illustrated in

TABLE 3

| Example or Comparative example | Polyimide Synthesis example | Polyimide (wt. parts) | Polyphenylene sulfide RYTON P-4 (wt. parts) | Minimum injection pressure ($kg/cm^2$) | Tensile strength ($kg/cm^2$) | Elongation (%) | Flexural strength ($kg/cm^2$) | Flexural modulus ($kg/cm^2$) | Izod impact strength (notched) (kg cm/cm) | Heat distortion temperature (°C.) (18.6 $kg/cm^2$) |
|---|---|---|---|---|---|---|---|---|---|---|
| Ex. 1 | 1 | 95 | 5 | 450 | 960 | 93 | 1,400 | 30,000 | 8.3 | 192 |
| Ex. 2 | 1 | 75 | 25 | 250 | 920 | 72 | 1,310 | 33,000 | 7.4 | 187 |
| Ex. 3 | 1 | 50 | 50 | * | 890 | 48 | 1,200 | 37,000 | 6.0 | 180 |
| Comp. 1 | 1 | 100 | 0 | 500 | 1,005 | 100 | 1,450 | 28,000 | 8.4 | 200 |

*Lower than detection limit of 40 $kg/cm^2$.

TABLE 4

| Example or Comparative example | Polyimide Synthesis example | Polyimide (wt. parts) | Polyphenylene sulfide RYTON P-4 (wt. parts) | Minimum injection pressure ($kg/cm^2$) | Tensile strength ($kg/cm^2$) | Elongation (%) | Flexural strength ($kg/cm^2$) | Flexural modulus ($kg/cm^2$) | Izod impact strength (notched) (kg cm/cm) | Heat distortion temperature (°C.) (18.6 $kg/cm^2$) |
|---|---|---|---|---|---|---|---|---|---|---|
| Ex. 4 | 2 | 95 | 5 | 480 | 900 | 77 | 1,250 | 24,000 | 7.0 | 177 |
| Ex. 5 | 2 | 50 | 50 | 280 | 830 | 43 | 1,180 | 38,000 | 5.5 | 167 |
| Comp. 2 | 2 | 100 | 0 | 530 | 920 | 82 | 1,280 | 23,000 | 7.2 | 181 |
| Ex. 6 | 3 | 95 | 5 | 420 | 870 | 72 | 1,150 | 22,000 | 6.8 | 176 |
| Ex. 7 | 3 | 50 | 50 | 240 | 800 | 41 | 1,090 | 36,000 | 5.2 | 166 |
| Comp. 3 | 3 | 100 | 0 | 480 | 900 | 75 | 1,190 | 20,000 | 6.7 | 180 |
| Ex. 8 | 4 | 90 | 10 | 480 | 930 | 82 | 1,320 | 31,500 | 7.2 | 214 |
| Ex. 9 | 4 | 50 | 50 | 260 | 850 | 48 | 1,230 | 39,000 | 5.6 | 180 |
| Comp. 4 | 4 | 100 | 0 | 550 | 980 | 90 | 1,400 | 29,100 | 7.5 | 227 |
| Ex. 10 | 5 | 95 | 5 | 430 | 1,000 | 120 | 1,280 | 30,500 | 8.3 | 205 |
| Ex. 11 | 5 | 85 | 15 | 380 | 890 | 115 | 1,170 | 32,000 | 8.0 | 197 |
| Ex. 12 | 5 | 75 | 25 | 330 | 790 | 109 | 1,120 | 33,500 | 6.0 | 192 |
| Comp. 5 | 5 | 100 | 0 | 480 | 1,040 | 123 | 1,300 | 28,100 | 8.5 | 208 |

COMPARATIVE EXAMPLE 6

The same procedures as Examples 13-15 were carried out except that a composition outside the scope of this invention was used. The physical and thermal properties of molded specimens were measured and the results are illustrated in Table 5.

EXAMPLES 16-23 AND COMPARATIVE EXAMPLES 7-10

The procedures of Examples 13-15 were repeated except that the polyimide powder obtained in Synthesis examples 2-5 and aromatic polysulfone UDEL POLYSULFONE P-1700 were used to give uniformly blended pellets. The pellets were injection molded.

Physical and thermal properties were measured on the molded specimens. The results on examples both within and outside the scope of this invention are illustrated in Table 6 as Examples 16-23 and Comparative examples 7-10, respectively.

EXAMPLES 24-27

The polyimide powder obtained in Synthesis example 1 was dry blended with aromatic polyetherimide ULTEM 1000 (a trademarked product of General Electric Co.) in various compositions as illustrated in Table 7. The mixture was kneaded by fusing at 370-400° C. in a double screw extruder and extruded to obtain uniform pellets. The pellets thus obtained was injection molded at an injection temperature of 360-390° C. and a mold temperature of 150° C. The physical and thermal properties of the molded product were measured and the results are illustrated in Table 7.

TABLE 5

| Example or Comparative example | Polyimide Synthesis example | Polyimide (wt. parts) | Aromatic Polysulfone UDEL POLYSULFONE P-1700 (wt. parts) | Minimum injection pressure ($kg/cm^2$) | Tensile strength ($kg/cm^2$) | Elongation (%) | Flexural strength ($kg/cm^2$) | Flexural modulus ($kg/cm^2$) | Izod impact strength (notched) (kg cm/cm) | Heat distortion temperature (°C.) (18.6 $kg/cm^2$) | Tg (°C.) |
|---|---|---|---|---|---|---|---|---|---|---|---|
| Ex. 13 | 1 | 95 | 5 | 400 | 1,000 | 100 | 1,430 | 28,000 | 8.3 | 195 | 230 |
| Ex. 14 | 1 | 75 | 25 | 300 | 930 | 94 | 1,360 | 27,900 | 8.0 | 191 | 222 |
| Ex. 15 | 1 | 50 | 50 | 260 | 880 | 86 | 1,300 | 27,700 | 7.7 | 186 | 210 |
| Comp. 6 | 1 | 100 | 0 | 500 | 1,005 | 100 | 1,450 | 28,000 | 8.4 | 200 | 235 |

TABLE 6

| Example or Comparative example | Polyimide Synthesis example | Polyimide (wt. parts) | Aromatic Polysulfone UDEL POLYSULFONE P-1700 (wt. parts) | Minimum injection pressure ($kg/cm^2$) | Tensile strength ($kg/cm^2$) | Elongation (%) | Flexural strength ($kg/cm^2$) | Flexural modulus ($kg/cm^2$) | Izod impact strength (notched) (kg cm/cm) | Heat distortion temperature (°C.) (18.6 $kg/cm^2$) | Tg (°C.) |
|---|---|---|---|---|---|---|---|---|---|---|---|
| Ex. 16 | 2 | 95 | 5 | 420 | 900 | 81 | 1,250 | 23,700 | 7.2 | 180 | 197 |
| Ex. 17 | 2 | 50 | 50 | 270 | 830 | 77 | 1,190 | 25,700 | 7.2 | 177 | 195 |

TABLE 6-continued

| Example or Comparative example | Polyimide Synthesis example | Polyimide (wt. parts) | Aromatic Polysulfone UDEL POLYSULFONE P-1700 (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) | Tg (°C.) |
|---|---|---|---|---|---|---|---|---|---|---|---|
| Comp. 7 | 2 | 100 | 0 | 500 | 920 | 82 | 1,280 | 23,000 | 7.2 | 181 | 198 |
| Ex. 18 | 3 | 90 | 10 | 370 | 890 | 72 | 1,200 | 20,500 | 6.9 | 183 | 205 |
| Ex. 19 | 3 | 50 | 50 | 260 | 880 | 65 | 1,230 | 23,700 | 7.6 | 192 | 218 |
| Comp. 8 | 3 | 100 | 0 | 480 | 900 | 75 | 1,190 | 20,000 | 6.7 | 180 | 197 |
| Ex. 20 | 4 | 95 | 5 | 430 | 970 | 83 | 1,380 | 29,000 | 7.6 | 223 | 241 |
| Ex. 21 | 4 | 50 | 50 | 280 | 930 | 73 | 1,360 | 28,100 | 8.2 | 216 | 235 |
| Comp. 9 | 4 | 100 | 0 | 550 | 980 | 90 | 1,400 | 29,100 | 7.5 | 227 | 245 |
| Ex. 22 | 5 | 95 | 5 | 390 | 1,000 | 118 | 1,300 | 28,100 | 8.4 | 204 | 222 |
| Ex. 23 | 5 | 50 | 50 | 250 | 920 | 100 | 1,210 | 27,800 | 7.9 | 193 | 218 |
| Comp. 10 | 5 | 100 | 0 | 480 | 1,040 | 123 | 1,300 | 28,100 | 8.5 | 208 | 225 |

COMPARATIVE EXAMPLE 11

The same procedures as Examples 24–27 were carried out except that a composition outside the scope of this invention was used. The physical and thermal properties of molded specimens were measured and the results are illustrated in Table 7.

EXAMPLES 28–35 AND COMPARATIVE EXAMPLES 12–15

The procedures of Examples 24–27 were repeated except that the polyimide powder obtained in Synthesis examples 2–5 and aromatic polyetherimide ULTEM 1000 were used to give uniformly blended pellets. The pellets were injection molded. Physical and thermal properties were measured on the molded specimens. The results on examples both within and outside the scope of this invention are illustrated in Table 8 as Examples 28–35 and Comparative examples 12–15, respectively.

EXAMPLES 36–38

The polyimide powder obtained in Synthesis example 6 was dry blended with polyphenylene sulfide powder RYTON P-4 in various compositions as illustrated in Table 9. The mixture was kneaded by fusing at 320–420° C. in a double screw extruder and extruded to obtain uniform pellets. The pellets thus obtained was injection molded at an injection temperature of 320–420° C. and a mold temperature of 150° C. The physical and thermal properties of the molded product were measured and the results are illustrated in Table 9.

TABLE 7

| Example or Comparative example | Polyimide Synthesis example | Polyimide (wt. parts) | Aromatic polyetherimide ULTEM-1000 (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) |
|---|---|---|---|---|---|---|---|---|---|---|
| Ex. 24 | 1 | 95 | 5 | 500 | 1,010 | 95 | 1,450 | 28,500 | 8.3 | 200 |
| Ex. 25 | 1 | 85 | 15 | 460 | 1,020 | 91 | 1,455 | 29,600 | 8.0 | 200 |
| Ex. 26 | 1 | 75 | 25 | 430 | 1,030 | 86 | 1,460 | 30,400 | 7.6 | 200 |
| Ex. 27 | 1 | 50 | 50 | 400 | 1,040 | 80 | 1,470 | 31,000 | 7.0 | 200 |
| Comp. 11 | 1 | 100 | 0 | 500 | 1,005 | 100 | 1,450 | 28,000 | 8.4 | 200 |

TABLE 8

| Example or Comparative example | Polyimide Synthesis example | Polyimide (wt. parts) | Aromatic polyetherimide ULTEM-1000 (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) |
|---|---|---|---|---|---|---|---|---|---|---|
| Ex. 28 | 2 | 90 | 10 | 470 | 960 | 80 | 1,300 | 24,600 | 7.0 | 183 |
| Ex. 29 | 2 | 50 | 50 | 390 | 1,000 | 73 | 1,390 | 28,450 | 6.4 | 190 |
| Comp. 12 | 2 | 100 | 0 | 530 | 920 | 82 | 1,280 | 23,000 | 7.2 | 181 |
| Ex. 30 | 3 | 70 | 30 | 415 | 920 | 70 | 1,230 | 23,100 | 6.4 | 183 |
| Ex. 31 | 3 | 50 | 50 | 400 | 980 | 68 | 1,350 | 27,000 | 6.0 | 190 |
| Comp. 13 | 3 | 100 | 0 | 480 | 900 | 75 | 1,190 | 20,000 | 6.7 | 180 |
| Ex. 32 | 4 | 95 | 5 | 480 | 1,000 | 85 | 1,420 | 30,000 | 7.4 | 223 |
| Ex. 33 | 4 | 75 | 25 | 400 | 1,020 | 70 | 1,460 | 32,400 | 7.0 | 219 |
| Comp. 14 | 4 | 100 | 0 | 550 | 980 | 90 | 1,400 | 29,100 | 7.5 | 227 |
| Ex. 34 | 5 | 75 | 25 | 420 | 1,050 | 112 | 1,350 | 32,300 | 7.9 | 206 |
| Ex. 35 | 5 | 50 | 50 | 380 | 1,060 | 94 | 1,400 | 31,000 | 7.1 | 204 |
| Comp. 15 | 5 | 100 | 0 | 480 | 1,040 | 123 | 1,300 | 28,100 | 8.5 | 208 |

COMPARATIVE EXAMPLE 16–17

The same procedures as Examples 36–38 were carried out except that a composition outside the scope of this invention was used. The physical and thermal properties of molded specimens were measured and the results are illustrated in Table 9.

EXAMPLES 39-47 AND COMPARATIVE EXAMPLES 18-21

The procedures of Examples 36-38 were repeated except that the polyimide powder obtained in Synthesis exaples 7-10 and polyphenylene sulfide powder RYTON P-4 were used to give uniformly blended pellets. The pellets were injection molded. Physical and thermal properties were measured on the molded specimens. The results on examples both within and outside the scope of this invention are illustrated in Table 10 as Examples 39-47 and Comparative examples 18-21, respectively.

EXAMPLES 48-50

The polyimide powder obtained in Synthesis example 6 was dry blended with aromatic polysulfone UDEL POLYSULFONE P-1700 in various compositions as illustrated in Table 11. The mixture was kneaded by fusing in a double screw extruder and extruded to obtain uniform pellets. The pellets thus obtained were injection molded at an injection temperature of 380-400° C. and a mold temperature of 170° C. The physical and thermal properties of the molded product were measured and the results are illustrated in Table 11.

COMPARATIVE EXAMPLE 22

The same procedures as Examples 48-50 were carried out except that a composition outside the scope of this invention was used. The physical and thermal properties of molded specimens were measured and the results are illustrated in Table 11.

TABLE 9

| Example or Comparative example | Polyimide Synthesis example | Polyimide (wt. parts) | Polyphenylene sulfide RYTON P-4 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 36 | 6 | 95 | 5 | 360 | 980 | 38 | 1,480 | 34,000 | 18.2 | 254 |
| Ex. 37 | 6 | 80 | 20 | 240 | 930 | 34 | 1,400 | 36,000 | 15.9 | 239 |
| Ex. 38 | 6 | 50 | 50 | 130 | 850 | 20 | 1,250 | 38,000 | 12.0 | 205 |
| Comp. 16 | 6 | 100 | 0 | 500 | 1,000 | 40 | 1,500 | 29,000 | 18.9 | 260 |
| Comp. 17 | 6 | 0 | 100 | * | 680 | 1.6 | 1,000 | 42,000 | 2.4 | 140 |

*Lower than detection limit of 40 kg/cm$^2$.

TABLE 10

| Example or Comparative example | Polyimide Synthesis example | Polyimide (wt. parts) | Polyphenylene sulfide RYTON P-4 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 39 | 7 | 95 | 5 | 360 | 900 | 17 | 1,320 | 25,300 | 10.0 | 213 |
| Ex. 40 | 7 | 50 | 50 | 240 | 800 | 11 | 1,150 | 32,600 | 8.0 | 180 |
| Comp. 18 | 7 | 100 | 0 | 500 | 910 | 18 | 1,340 | 20,000 | 10.3 | 217 |
| Ex. 41 | 8 | 95 | 5 | 350 | 990 | 27 | 1,430 | 32,000 | 12.5 | 207 |
| Ex. 42 | 8 | 50 | 50 | 200 | 850 | 16 | 1,260 | 37,300 | 9.0 | 175 |
| Comp. 19 | 8 | 100 | 0 | 480 | 1,000 | 28 | 1,450 | 28,000 | 13.0 | 210 |
| Ex. 43 | 9 | 90 | 10 | 340 | 1,010 | 30 | 1,260 | 30,800 | 14.2 | 227 |
| Ex. 44 | 9 | 50 | 50 | 220 | 890 | 17 | 1,200 | 35,500 | 9.0 | 188 |
| Comp. 20 | 9 | 100 | 0 | 550 | 1,040 | 32 | 1,380 | 25,600 | 15.5 | 236 |
| Ex. 45 | 10 | 95 | 5 | 340 | 980 | 35 | 1,460 | 32,800 | 14.3 | 193 |
| Ex. 46 | 10 | 85 | 15 | 320 | 960 | 32 | 1,410 | 34,000 | 13.1 | 188 |
| Ex. 47 | 10 | 75 | 25 | 240 | 930 | 28 | 1,360 | 36,000 | 11.8 | 182 |
| Comp. 21 | 10 | 100 | 0 | 460 | 1,000 | 37 | 1,480 | 28,500 | 15.0 | 196 |

TABLE 11

| Example or Comparative example | Polyimide Synthesis example | Polyimide (wt. parts) | Aromatic Polysulfone UDEL POLYSULFONE P-1700 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) | Tg (°C.) |
|---|---|---|---|---|---|---|---|---|---|---|---|
| Ex. 48 | 6 | 95 | 5 | 470 | 990 | 42 | 1,480 | 28,900 | 18.3 | 256 | 280 |
| Ex. 49 | 6 | 75 | 25 | 380 | 930 | 48 | 1,400 | 28,600 | 15.9 | 239 | 261 |
| Ex. 50 | 6 | 50 | 50 | 310 | 860 | 55 | 1,300 | 28,300 | 13.5 | 218 | 238 |
| Comp. 22 | 6 | 100 | 0 | 500 | 1,000 | 40 | 1,500 | 29,000 | 18.9 | 260 | 285 |

EXAMPLES 51-58 AND COMPARATIVE EXAMPLES 23-26

The procedures of Examples 48-50 were repeated except that the polyimide powder obtained in Synthesis examples 7-10 and aromatic polysulfone VICTREX PES 3600P (a trademarked product of Imperial Chemical Industries) or aromatic polysulfone UDEL POLYSULFONE P-1700 were used to give uniformly blended pellets. The pellets were injection molded. Physical and thermal properties were measured on the molded specimens. The results on examples both within and outside the scope of this invention are illustrated in Table 12 as Examples 51-58 and Comparative examples 23-26, respectively.

EXAMPLES 59-62

TABLE 12

| Example or Comparative example | Polyimide Synthesis example | (wt. parts) | Aromatic Polysulfone U* or V* | (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) | Tg (°C.) |
|---|---|---|---|---|---|---|---|---|---|---|---|---|
| Ex. 51 | 7 | 95 | U | 5 | 480 | 900 | 21 | 1,330 | 20,400 | 10.1 | 215 | 239 |
| Ex. 52 | 7 | 50 | U | 50 | 320 | 820 | 44 | 1,220 | 23,800 | 8.7 | 196 | 216 |
| Comp. 23 | 7 | 100 | | 0 | 530 | 910 | 18 | 1,340 | 20,000 | 10.3 | 217 | 242 |
| Ex. 53 | 8 | 90 | V | 10 | 420 | 990 | 30 | 1,440 | 27,800 | 12.6 | 209 | 234 |
| Ex. 54 | 8 | 50 | V | 50 | 300 | 930 | 39 | 1,390 | 27,300 | 10.9 | 207 | 230 |
| Comp. 24 | 8 | 100 | | 0 | 480 | 1,000 | 29 | 1,450 | 28,000 | 13.0 | 210 | 235 |
| Ex. 55 | 9 | 95 | V | 5 | 480 | 1,030 | 33 | 1,380 | 25,600 | 15.2 | 234 | 259 |
| Ex. 56 | 9 | 50 | V | 50 | 310 | 950 | 41 | 1,350 | 26,000 | 12.1 | 220 | 243 |
| Comp. 25 | 9 | 100 | | 0 | 550 | 1,040 | 32 | 1,380 | 25,600 | 15.5 | 236 | 261 |
| Ex. 57 | 10 | 95 | U | 5 | 430 | 990 | 39 | 1,460 | 28,400 | 14.6 | 195 | 218 |
| Ex. 58 | 10 | 50 | U | 50 | 300 | 860 | 54 | 1,290 | 28,000 | 11.0 | 186 | 205 |
| Comp. 26 | 10 | 100 | | 0 | 460 | 1,040 | 37 | 1,480 | 28,500 | 15.5 | 196 | 219 |

*U: UDEL POLYSULFONE P-1700
V: VICTREX PES 3600P

TABLE 13

| Example or Comparative example | Polyimide Synthesis example | (wt. parts) | Aromatic polyetherimide ULTEM-1000 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 59 | 6 | 95 | 5 | 470 | 1,000 | 41 | 1,500 | 29,300 | 18.2 | 257 |
| Ex. 60 | 6 | 85 | 15 | 440 | 1,000 | 43 | 1,500 | 29,700 | 16.7 | 251 |
| Ex. 61 | 6 | 75 | 25 | 420 | 1,000 | 45 | 1,500 | 30,200 | 15.2 | 245 |
| Ex. 62 | 6 | 50 | 50 | 390 | 1,000 | 50 | 1,510 | 31,400 | 11.5 | 230 |
| Comp. 27 | 6 | 100 | 0 | 500 | 1,000 | 40 | 1,500 | 29,000 | 18.9 | 260 |

The polyimide powder obtained in Synthesis example 6 was dry blended with aromatic polyetherimide ULTEM 1000 in various compositions as illustrated in Table 13. The mixture was kneaded by fusing at 350-370° C. in a double screw extruder and extruded to obtain uniform pellets. The pellets thus obtained were injection molded at an injection temperature of 380-400° C. and a mold temperature of 170° C. The physical and thermal properties of the molded product were measured and the results are illustrated in Table 13.

COMPARATIVE EXAMPLE 27

The same procedures as Examples 59-62 were carried out except that a composition outside the scope of this invention was used. The physical and thermal properties of molded specimens were measured and the results are illustrated in Table 13.

EXAMPLES 63-70 AND COMPARATIVE EXAMPLES 28-31

The procedures of Examples 59-62 were repeated the polyimide powder obtained in Synthesis examples 7-10 and aromatic polyetherimide ULTEM 1000 were used to give uniformly blended pellets. The pellets were injection molded. Physical and thermal properties were measured on the molded specimens. The results on examples both within and outside the scope of this invention are illustrated in Table 14 as Examples 63-70 and Comparative examples 28-31, respectively.

TABLE 14

| Example or Comparative example | Polyimide Synthesis example | (wt. parts) | Aromatic polyetherimide ULTEM-1000 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 63 | 7 | 90 | 10 | 480 | 920 | 22 | 1,360 | 21,400 | 9.5 | 215 |
| Ex. 64 | 7 | 50 | 50 | 400 | 960 | 39 | 1,430 | 26,900 | 7.2 | 209 |
| Comp. 28 | 7 | 100 | 0 | 530 | 910 | 18 | 1,340 | 20,000 | 10.3 | 217 |
| Ex. 65 | 8 | 70 | 30 | 400 | 1,000 | 38 | 1,470 | 29,700 | 10.3 | 207 |
| Ex. 66 | 8 | 50 | 50 | 380 | 1,000 | 44 | 1,490 | 30,900 | 8.5 | 205 |
| Comp. 29 | 8 | 100 | 0 | 480 | 1,000 | 28 | 1,450 | 28,000 | 13.0 | 210 |
| Ex. 67 | 9 | 95 | 5 | 510 | 1,040 | 33 | 1,390 | 26,000 | 14.9 | 234 |
| Ex. 68 | 9 | 75 | 25 | 450 | 1,030 | 39 | 1,420 | 27,600 | 12.6 | 227 |
| Comp. 30 | 9 | 100 | 0 | 550 | 1,040 | 32 | 1,380 | 25,600 | 15.5 | 236 |
| Ex. 69 | 10 | 75 | 25 | 410 | 1,000 | 43 | 1,490 | 29,800 | 12.3 | 197 |
| Ex. 70 | 10 | 50 | 50 | 380 | 1,000 | 49 | 1,500 | 31,100 | 9.5 | 198 |
| Comp. 31 | 10 | 100 | 0 | 460 | 1,000 | 37 | 1,480 | 28,500 | 15.0 | 196 |

What is claimed is:

1. A polyimide resin composition comprised of 99.9 to 50.0% by weight of polyimide which has recurring units of the formula:

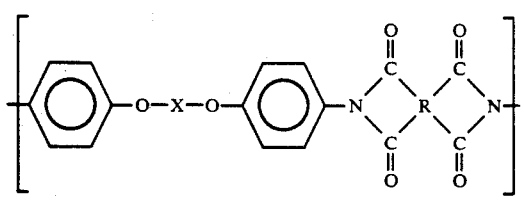

wherein X is a divalent radical selected from the group consisting of a radical having the formula:

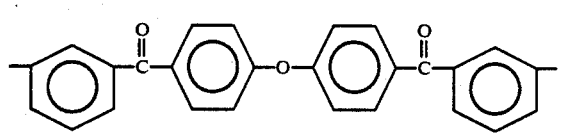

and

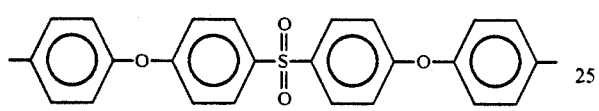

and R is a tetravalent radical selected from the group consisting of an aliphatic radical having 2 or more carbon atoms, alicyclic radical, monoaromatic radical, fused polyaromatic radical, and polyaromatic radical where aromatic radicals are linked to one another directly or via a bridge member, and 0.1 to 50.0% by weight of high-temperature engineering polymer different from said polyimide and selected from the group consisting of polyphenylene sulfide, aromatic polysulfone and aromatic polyetherimide substantially composed of recurring units of the following formula:

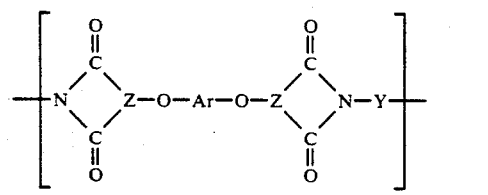

wherein Z is a trivalent aromatic radical where two valences out of three are connected with two adjacent carbon atoms, and Ar and Y are respectively a divalent monoaromatic radical and a divalent non-condensed diaromatic radical connected with a bridge member.

2. The polyimide resin composition as claimed in claim 1 wherein X is a divalent radical having the formula:

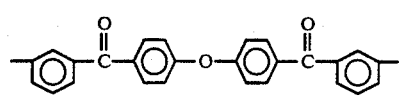

3. The polyimide resin composition as claimed in claim 1 wherein X is a divalent radical having the formula:

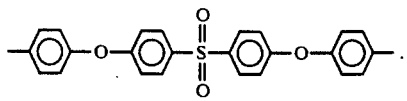

4. The polyimide resin composition as claimed in claim 1 wherein R is a tetravalent radical selected from the group consisting of

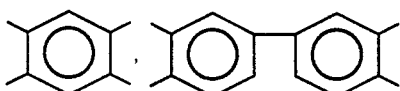

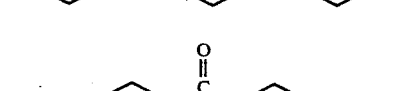

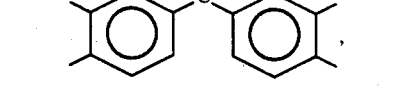

and

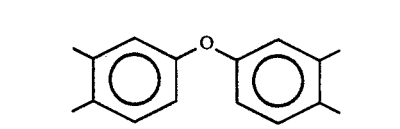

5. The polyimide resin composition as claimed in claim 2 wherein R is a tetravalent radical selected from the group consisting of

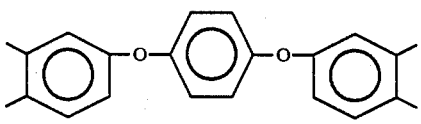

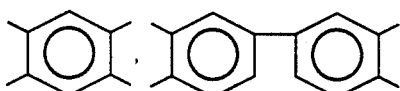

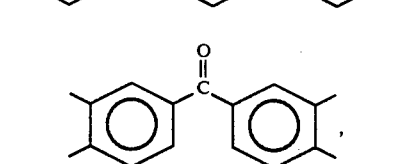

and

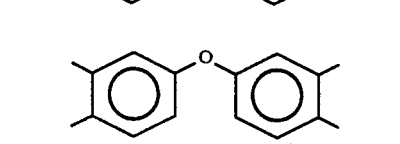

6. The polyimide resin composition as claimed in claim 3 wherein R is a tetravalent radical selected from the group consisting of

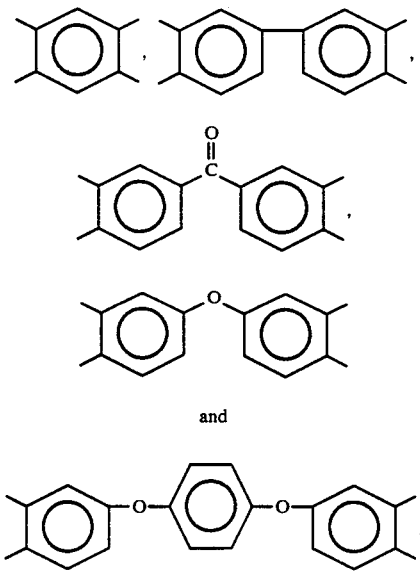

7. The polyimide resin composition as claimed in claim 1 wherein the high-temperature engineering polymer is polyphenylene sulfide.

8. The polyimide resin composition as claimed in claim 2 wherein the high-temperature engineering polymer is polyphenylene sulfide.

9. The polyimide resin composition as claimed in claim 3 wherein the high-temperature engineering polymer is polyphenylene sulfide.

10. The polyimide resin composition as claimed in claim 4 wherein the high-temperature engineering polymer is polyphenylene sulfide.

11. The polyimide resin composition as claimed in claim 5 wherein the high-temperature engineering polymer is polyphenylene sulfide.

12. The polyimide resin composition as claimed in claim 6 wherein the high-temperature engineering polymer is polyphenylene sulfide.

13. The polyimide resin composition as claimed in claim 1 wherein the high-temperature engineering polymer is aromatic polysulfone.

14. The polyimide resin composition as claimed in claim 2 wherein the high-temperature engineering polymer is aromatic polysulfone.

15. The polyimide resin composition as claimed in claim 3 wherein the high-temperature engineering polymer is aromatic polysulfone.

16. The polyimide resin composition as claimed in claim 4 wherein the high-temperature engineering polymer is aromatic polysulfone.

17. The polyimide resin composition as claimed in claim 5 wherein the high-temperature engineering polymer is aromatic polysulfone.

18. The polyimide resin composition as claimed in claim 6 wherein the high-temperature engineering polymer is aromatic polysulfone.

19. The polyimide resin composition as claimed in claim 1 wherein the high-temperature engineering polymer is aromatic polyetherimide.

20. The polyimide resin composition as claimed in claim 2 wherein the high-temperature engineering polymer is aromatic polyetherimide.

21. The polyimide resin composition as claimed in claim 3 wherein the high-temperature engineering polymer is aromatic polyetherimide.

22. The polyimide resin composition as claimed in claim 4 wherein the high-temperature engineering polymer is aromatic polyetherimide.

23. The polyimide resin composition as claimed in claim 5 wherein the high-temperature engineering polymer is aromatic polyetherimide.

24. The polyimide resin composition as claimed in claim 6 wherein the high-temperature engineering polymer is aromatic polyetherimide.

* * * * *